United States Patent
Thomas (10) Patent No.: US 6,832,046 B1
(45) Date of Patent: Dec. 14, 2004

(54) METHOD AND APPARATUS FOR MULTIRATE TRANSMISSION IN A PASSIVE OPTICAL NETWORK

(75) Inventor: Mark Thomas, Fremont, CA (US)

(73) Assignee: Mahi Networks, Petaluma, CA (US)

( * ) Notice: Subject to any disclaimer, the term of this patent is extended or adjusted under 35 U.S.C. 154(b) by 0 days.

(21) Appl. No.: 09/569,838

(22) Filed: May 11, 2000

Related U.S. Application Data (60) Provisional application No. 60/133,583, filed on May 11, 1999.

(51) Int. Cl.[7] ............................................. H04L 12/66
(52) U.S. Cl. .......................................... 398/72; 398/79
(58) Field of Search ................................ 359/168, 154, 359/137; 375/376, 373; 370/396, 352; 398/72, 79; 725/116

(56) References Cited

U.S. PATENT DOCUMENTS

| | | | | | |
|---|---|---|---|---|---|
| 5,572,349 | A | * | 11/1996 | Hale et al. | ................... 359/137 |
| 5,619,498 | A | * | 4/1997 | Sharpe | ....................... 370/396 |
| 5,815,295 | A | * | 9/1998 | Darcie et al. | ................. 398/72 |
| 5,818,511 | A | * | 10/1998 | Farry et al. | ................. 725/116 |
| 5,838,749 | A | * | 11/1998 | Casper et al. | ............... 375/376 |
| 5,963,608 | A | * | 10/1999 | Casper et al. | ............... 375/373 |
| 6,151,144 | A | * | 11/2000 | Knox | .......................... 398/79 |
| 6,466,572 | B1 | * | 10/2002 | Ethridge et al. | ............ 370/352 |

* cited by examiner

Primary Examiner—Jason Chan
Assistant Examiner—David C. Payne
(74) Attorney, Agent, or Firm—Blakely Sokoloff Taylor & Zafman LLP (57) ABSTRACT

Method and apparatus for a Passive Optical Network (PON) to operate at significantly higher data rates than the prior art Passive Optical Networks.

2 Claims, 12 Drawing Sheets

METHOD AND APPARATUS FOR MULTIRATE TRANSMISSION IN A PASSIVE OPTICAL NETWORK

This application claims the benefit of provisional patent application No. 60/133,583, filed May 11, 1999.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

Description of the Related Art

Figure 1:
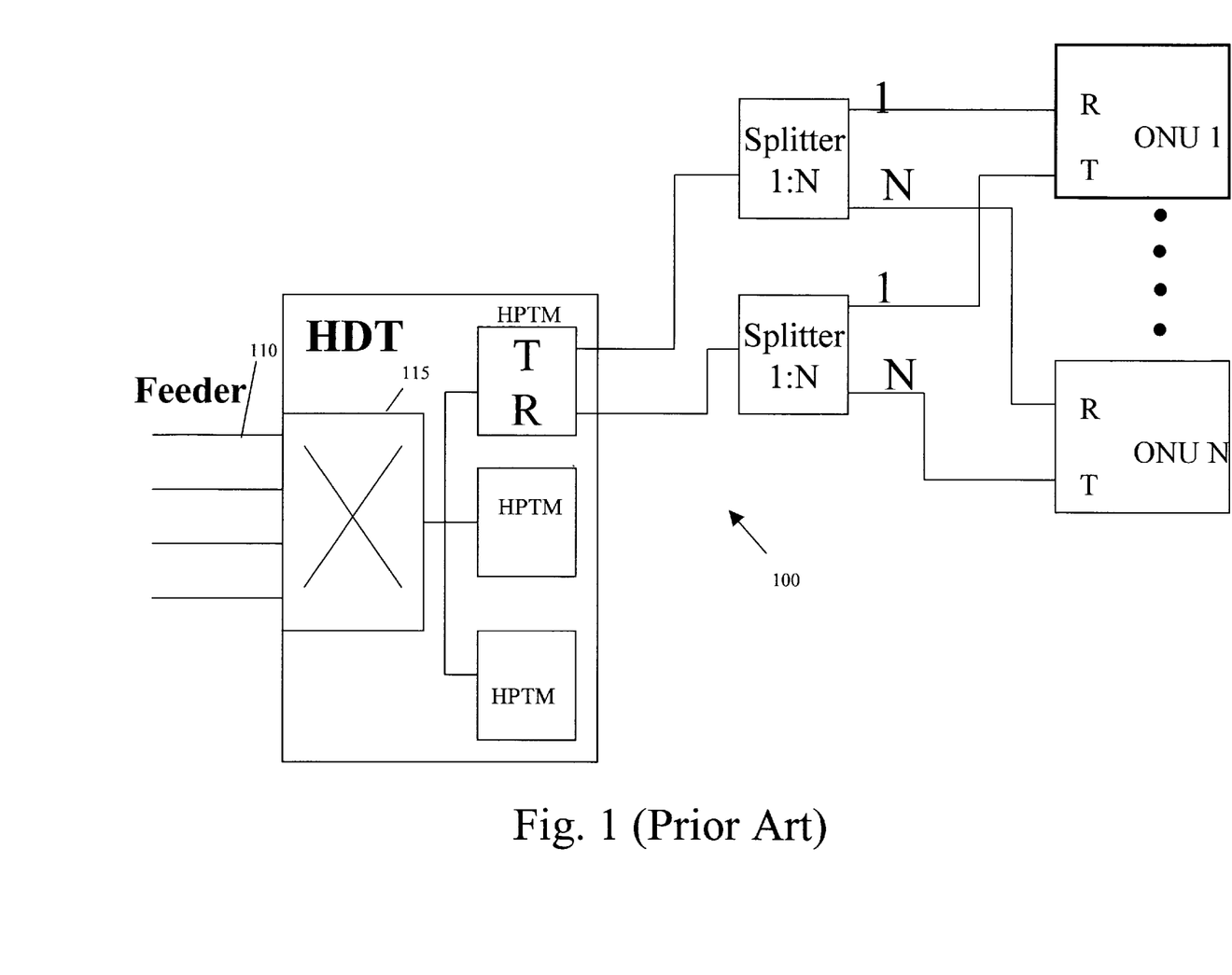
FIG. 1 is a prior art diagram of PON architecture.

The present invention relates to access networks. One such access network, a passive optical network (PON) 100, is illustrated in FIG. 1. Data flows from the external feeder network 110 through the distribution network 100 to the subscribers via the optical network units (ONUs) 1 through N. Data flow in this direction is referred to as the downstream direction. The feeder trunks are terminated at the host digital terminal (HDT) 115. The HDT 115 cross connects the feeder payload to the appropriate PON transmitter which in turn transmits it to all the ONUs subtended off that given PON. The ONUs provide the line card functionality to support the subscriber(s). The ONUs may either support multiple buildings or be dedicated to a single building.

The data flow from the subscriber via the ONUs to the feeder network. This is called the upstream direction. The subscribers send data to the ONUs which in turn transmit the data to the HDT over the PON. The HDT cross connects the PON payload to the appropriate feeder trunk.

A PON network traditionally has the following characteristics:

Both the upstream and downstream are digital.
The downstream is asynchronous, in both phase and frequency.
The downstream data rate is constant.
The downstream is sourced from a single distribution node.
The downstream optical power is equally split N ways to serve N network nodes.
The upstream is asynchronous in phase, and synchronous in frequency.
The upstream data rate from all nodes is the same.
The upstream optical power is equally combined N ways from the N network nodes to the distribution node.

Figure 5:
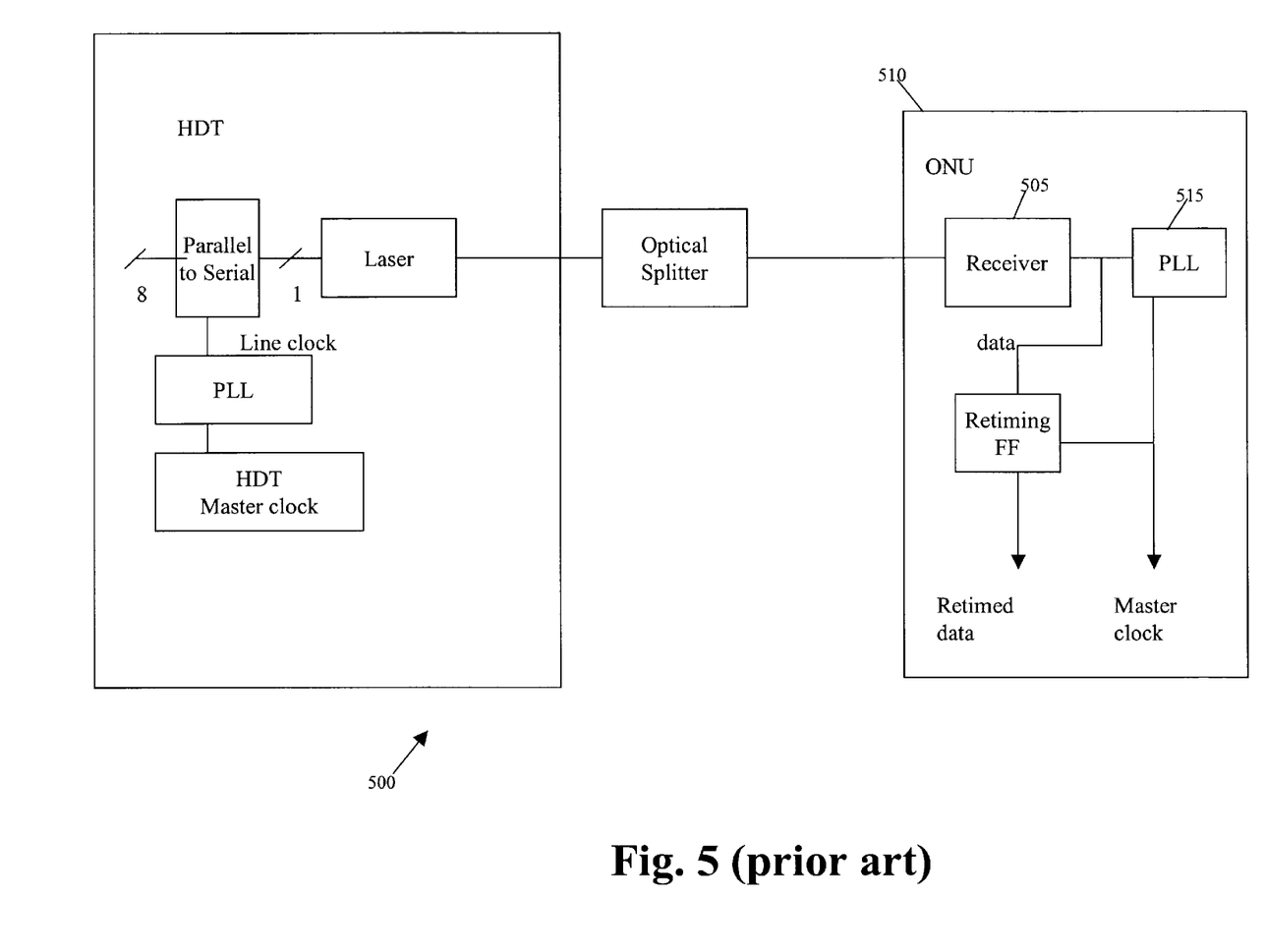
FIG. 5 is a prior art PON timing circuit.

With reference to FIG. 5, of particular interest is the method in which timing is distributed in the traditional PON. The traditional PON sources all its timing from the downstream direction. The Headend PON Termination Modules (HPTM) transmit an optical data stream at a fixed rate. The downstream data is terminated at the receiver 505 in the ONU 510. A PLL 515 in the ONU recovers the clock and retimes the data. The recovered clock acts as the master clock for all operations in the ONU, including the data rate for the line cards and the data rate for the upstream transmission as well. Because the data from the line cards must interface ultimately with the feeder line rate, the clock rate generally must be synchronized with the feeder data rate.

Figure 2:
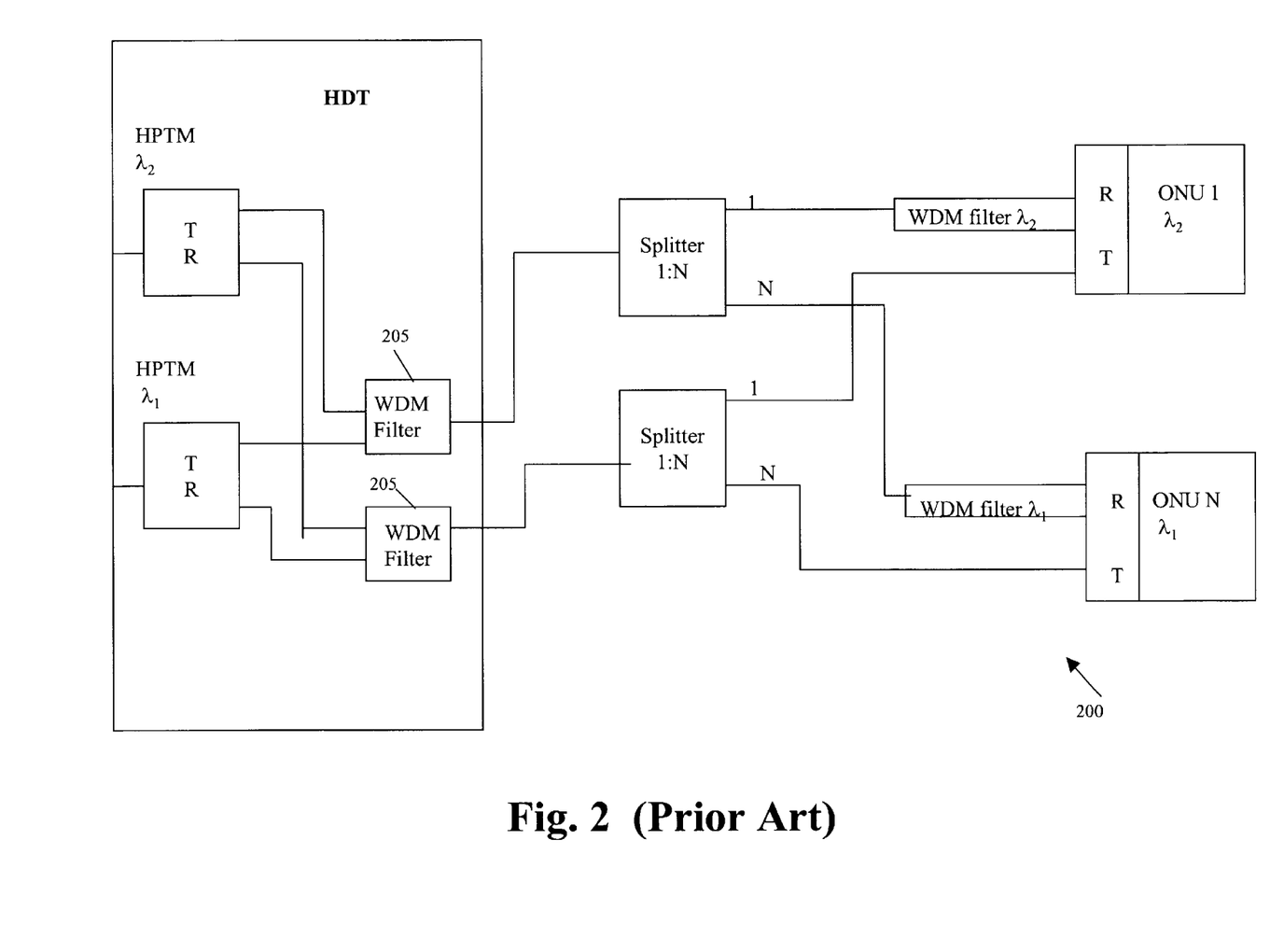
FIG. 2 is a prior art diagram of a WDM upgrade of a PON.

Although the PON architecture has a number of advantages over other architectures (such as point to point, mesh, active star, bus topologies) it does not have a good upgrade path. One prior art approach to upgrading a PON is a wave division multiplex (WDM) overlay as shown in FIG. 2. The salient features of a WDM overlay are:

1. The traffic carried by the second wavelength shares the same fiber and splitters.
2. Each ONU requires a WDM filter 205 to filter out the unwanted wavelength(s).

The disadvantages of this upgrade are:

1. The ONUs that are not upgraded must nevertheless have a filter installed. This is expensive and also affects service.
2. The ONUs that are upgraded have essentially the same end to end loss as those that are not upgraded. This makes it extremely difficult to design the transmitters and receivers for the higher speed upgraded PON. As data rates increase, receiver sensitivity decreases.

The designer of the link can either increase the power of the high speed transmitter or maintain the receiver sensitivity by using more sophisticated receiver circuitry. Usually both are done. If the transmitter power is increased, then crosstalk may be an issue requiring better, more expensive filters. Worse yet, if the PON is a single fiber PON, then the reflection budget is more difficult to manage, requiring yet more expensive filters. If the receiver sensitivity is maintained or increased, more sophisticated techniques and components are required. The net result, in any case, is an increase in cost and perhaps a longer design cycle. Furthermore, as speeds increase, the limits of technology to compensate only by changing the receiver or transmitter is reached.

A good upgrade path should allow for the data rate of the PON to be increased within the following constraints:

the upgrade can be done on a per network node basis. That is, one network node should be able to communicate at higher data rates without having to upgrade all other nodes on the same PON;

the upgrade should not affect service for those network nodes that are not upgraded;

no new cable is required. Slight modifications at the splitter may be permissible depending on the cost of those changes;

minimal changes to cards at the HDT and at the upgraded network node, optimally only the electro-optic printed circuit boards (PCB);

no changes at the non-upgraded network nodes.

Definition of Terms
DPAC—Digital Phase Acquisition Circuit
HDT—Host Digital Terminal
HPTM—Headend PON Termination Modules
ONU—Optical Network Unit.
PON—Passive Optical Network

SUMMARY OF THE INVENTION

This invention embodies several methods and the associated hardware and software necessary for a Passive Optical Network (PON) to operate at significantly higher data rates than the prior art Passive Optical Networks.

DETAILED DESCRIPTION OF THE EMBODIMENTS OF THE INVENTION

The present invention relates to an improved PON architecture.

Variable Data Rate

Figure 3:
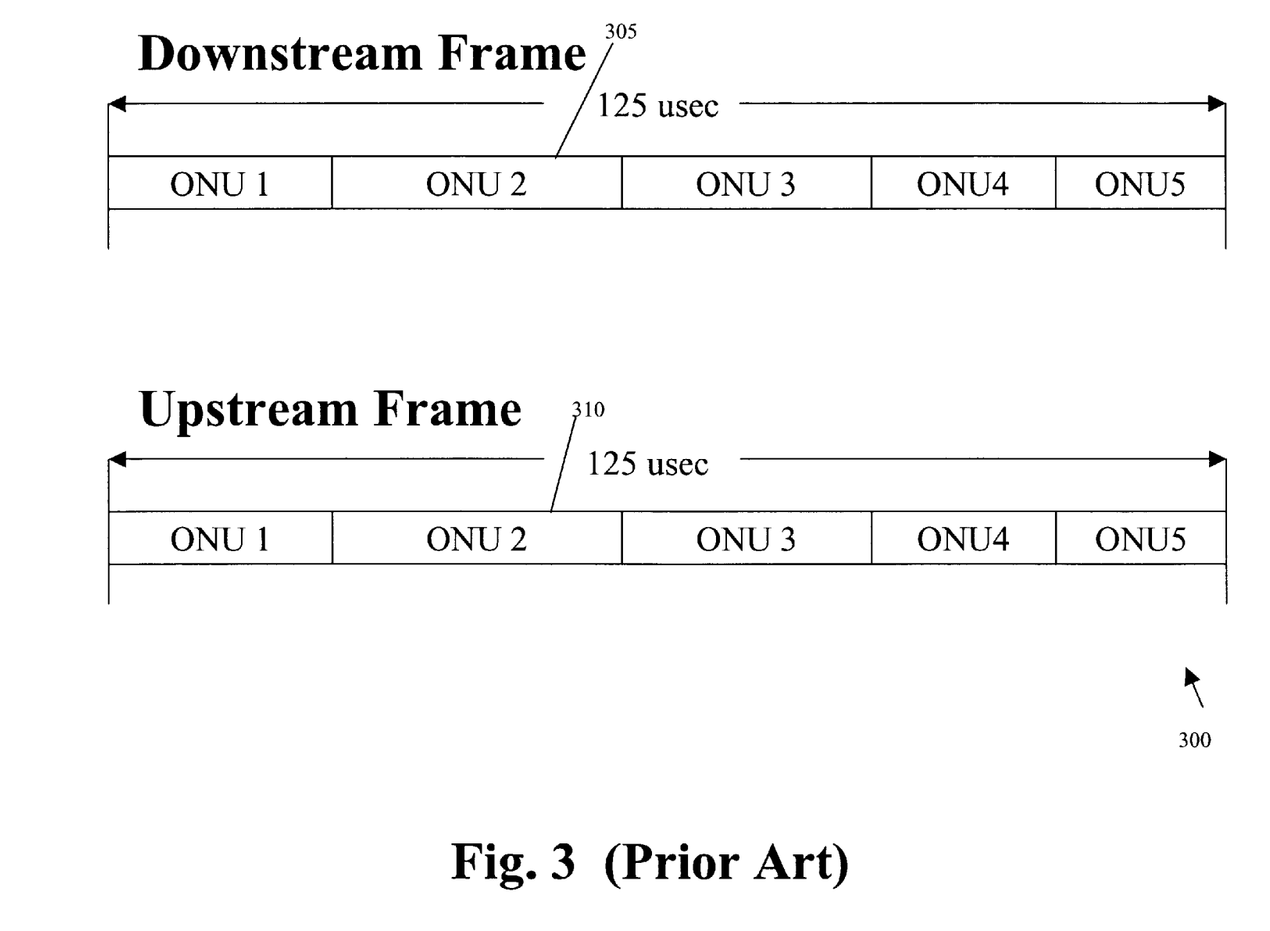
FIG. 3 is a prior art diagram of a frame structure and data rate allocation.
Figure 4:
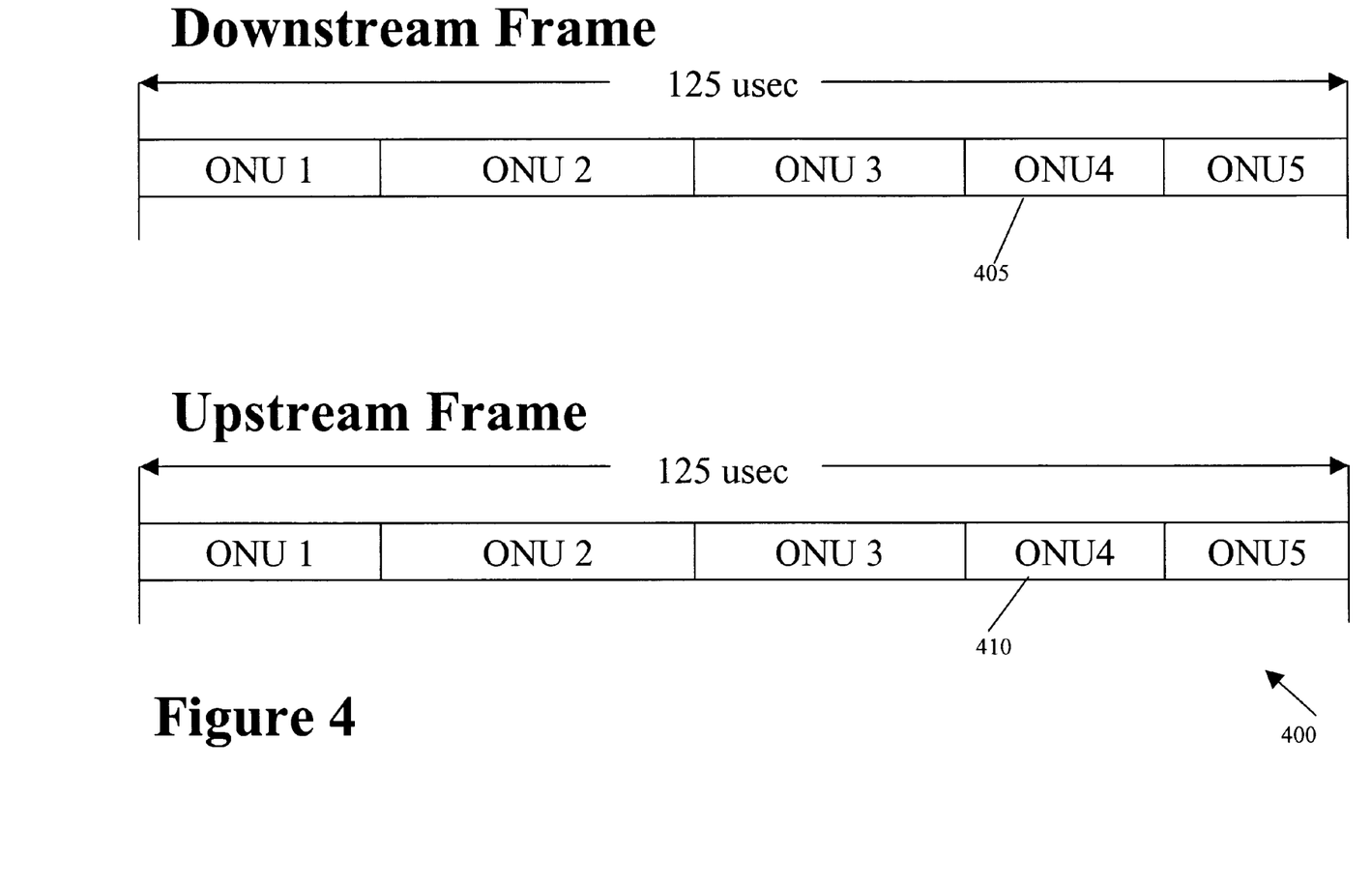
FIG. 4 is an embodiment of the present invention relating to data rate allocation.

According to one embodiment of the present invention, the data rate may be changed on a per packet basis. The term packet is used to identify a unit of data payload and its associated overhead bits either sourced by a single ONU (in the upstream direction) or received by an ONU or group of ONU(s) (in the downstream direction). With reference to FIG. 3, the downstream traffic 305 and upstream traffic 310 is arranged into frames that are 125 microseconds in length and are partitioned between ONUs 1 through 5. Each ONU is receiving data at 204.8 Mbps and transmitting data at 102.4 Mbps. (Note: these data rates are arbitrary and could be any fixed rate.) With reference to FIG. 4, the following modifications to this system are illustrated. ONUs 1, 2, 3 and 5 are still transmitting and receiving at the same data rates as before. However, ONU 4 is now receiving data at 614.4 Mbps at 405 and transmitting data at 204.8 Mbps at 410.

Given multiple rates on the same PON as set forth in FIG. 4, there are several potential problems to overcome: (1) multiplexing variable data rates through the source, (2) receivers optimized for data rate of 204.8 Mbps misinterpreting data at the higher rate of 614.4 Mbps, (3) receivers optimized for data rate of 614.4 Mbps misinterpreting data at the lower rate of 204.8 Mbps, and (4) the phase lock loops (PLLs) at the ONUs not functioning properly to receive data packets at a different data rate than that for which the PLLs were designed. The following discussion considers each of these potential problems in turn and the options for solving them.

Figure 6:
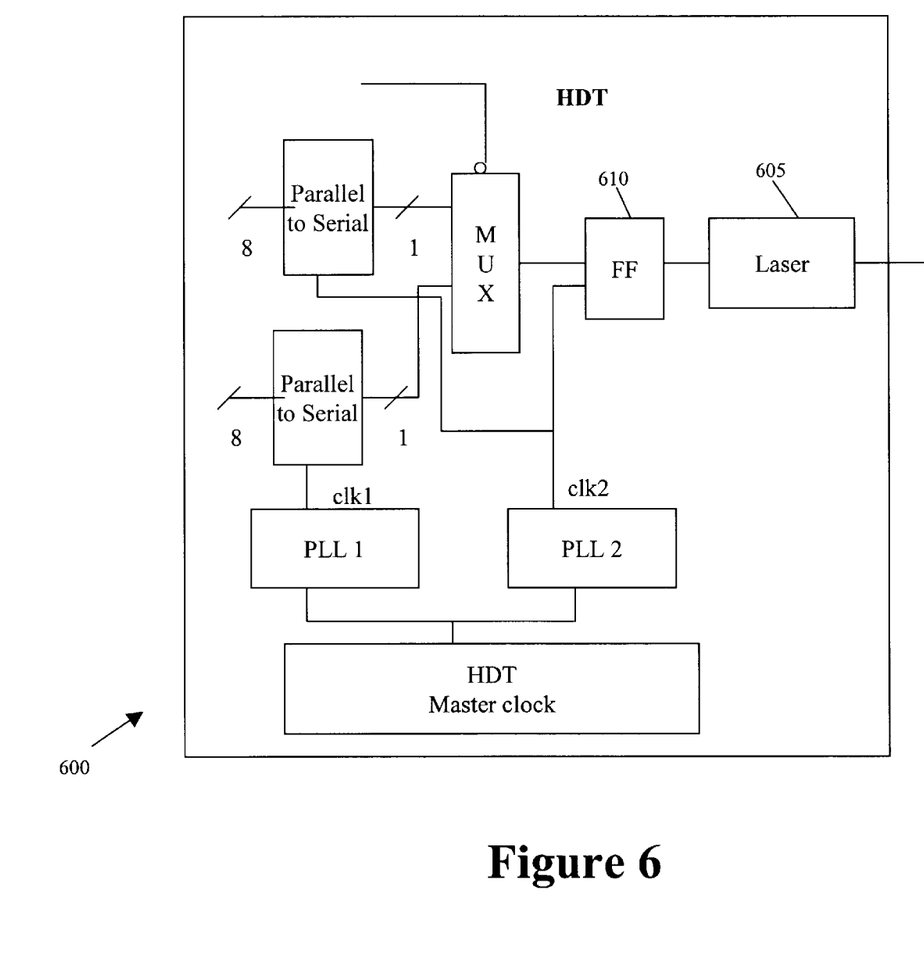
FIG. 6 is a block diagram of sourcing multiple data rates on the same PON.

Problem (1): the multiplexing of higher data rates with a lower data rate stream may be accomplished in a number of ways. One way is to treat the lower data rate as a higher data stream but with a longer stream of digital data. The multiplexing and retiming apparatus shown in FIG. 6 provides an embodiment of the invention for accomplishing this. The laser 605 itself is not the limiting factor since it transmits data at rates up to 10 Gbps (DFB) or 1 Gbps (Fabrey-Perot). Another embodiment utilizing multiplexing is disclosed below.

Problem (2) may be overcome by disabling the receiver output to a retiming flip flop (FF) 610 during the times when the data rate is not appropriate for that receiver. This decision making process may be built right into the protocol. One method is for the header in each packet be transmitted at the lower data rate. Part of the header is an identifier that indicates the speed of the packet. This information would be used to control the input or the output of the retiming FF.

Another, more efficient, way is to have the control channel program a gate signal inside each ONU, telling the ONU when to turn the retiming FF on or off. This eliminates the overhead that is repeated every 125 usec in the previous embodiment.

Problem (3) manifests itself if the receivers are AC coupled, in which case long strings of zeroes or ones during low rate packets may cause high rate receivers to experience DC drift. Scrambling will help this situation but will only reduce the probability of the occurrence. Encoding to minimize the length of strings of zeroes or ones is an alternative but wastes bandwidth. Another way to handle this problem is in the design of the receiver. There are many different embodiments possible. A DC restoration circuit with FET gated capacitors to prevent DC drift may be utilized. The most straightforward way is to use the same method that was used to solve problem (2), i.e. disable the receiver output to the retiming FF during the times when the data rate is not appropriate for that receiver.

Figure 7:
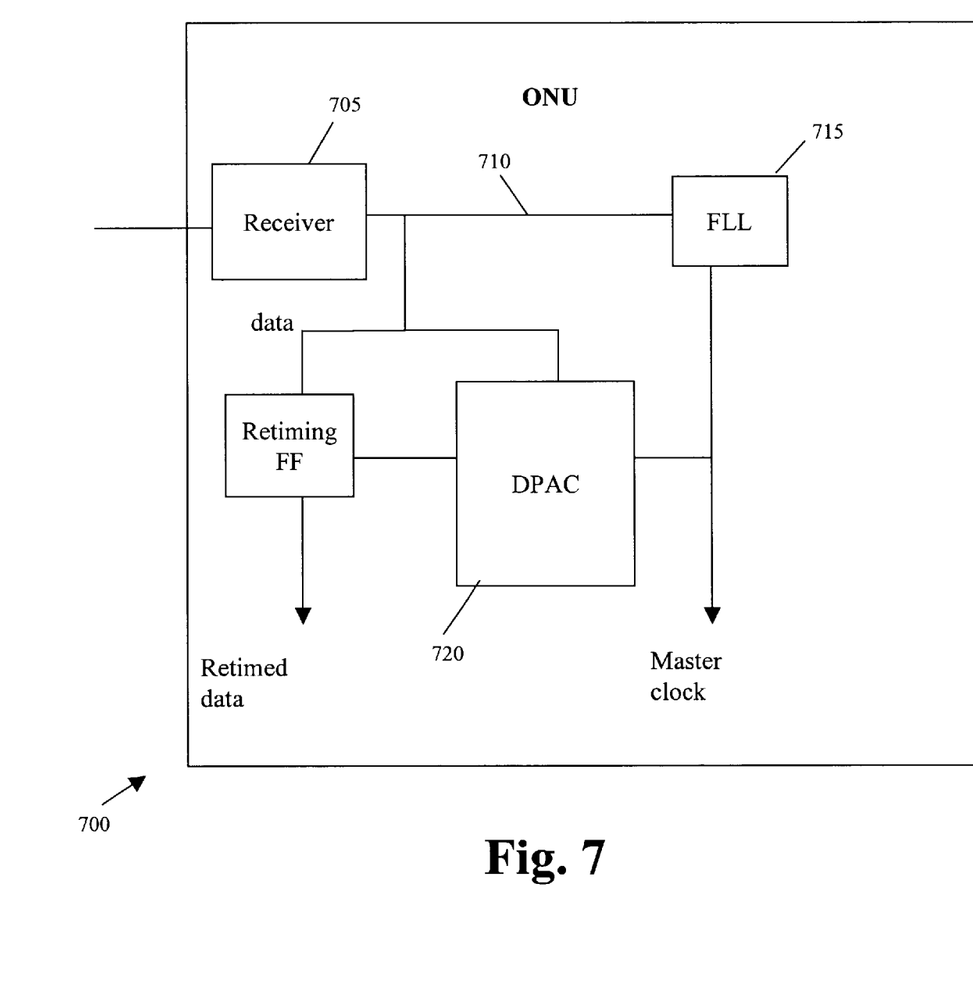
FIG. 7 is a block diagram of PON timing, in accordance with an embodiment of the present invention.

Problem (4) can be overcome by changing the way the master clock is obtained by altering the clock synchronization scheme at the ONU. As mentioned before, a PLL is normally used. The PLL simultaneously locks to the proper frequency and the proper phase to retime the data. Now consider the two alternative embodiments described below. The first is illustrated in FIG. 7. The receiver 705 output on line 710 drives a FLL 715, i.e. a feedback circuit that locks on frequency only and is not influenced by the phase of the data. Once again there are many different options for solutions. For example, the FLL will lock to the lowest common data rate of all the data rates on the PON. In this way, no matter what the configuration of downstream packet data rates, the FLL will always "see" spectral components in the range for which the FLL is optimized. For a given rate ONU, the "base rate" clock is multiplied up by a traditional PLL to the frequency of interest. The phase of the master clock used for retiming the received data is from a digital phase acquisition circuit (DPAC) 720.

Figure 8:
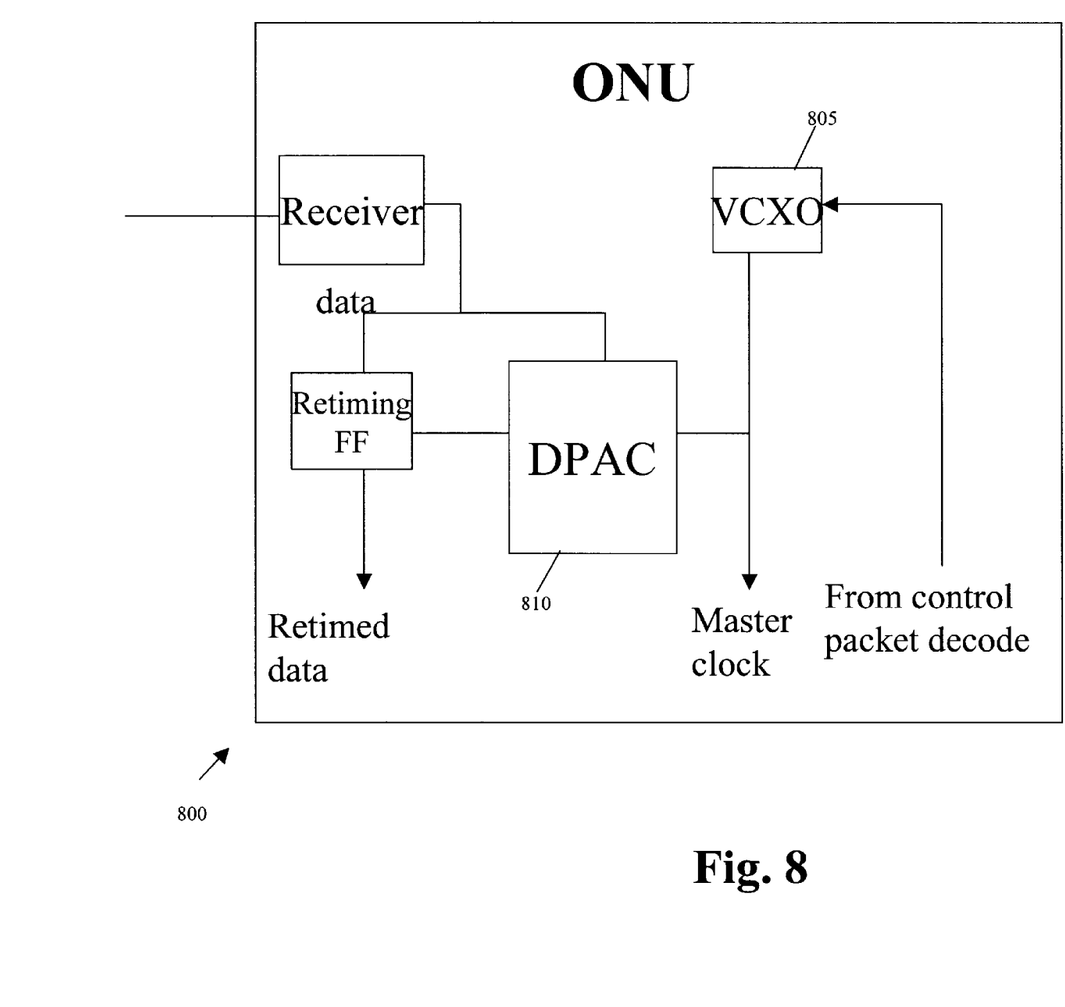
FIG. 8 is a block diagram of PON timing, in accordance with an embodiment of the present invention.

Another embodiment is shown in FIG. 8. In this embodiment, there is a stable VCXO oscillator 805 on board with a loose tolerance on frequency in order to minimize cost. 5 The VCXO is locked through a loop with the HDT which sends bits back via a control signal either in the control part of the ONU's packet header or in the control packet. This bit tells the ONU to either increase or decrease the voltage on the VCXO. Because of the speed limitations of VCXOs, it is necessary in most cases to include a PLL to multiply the frequency up to the line clock rates. As before a DPAC 810 is used to obtain the proper timing relationship with the received data.

Sourcing Different Data Rates Using Separate Slave HPTMs

Figure 9:
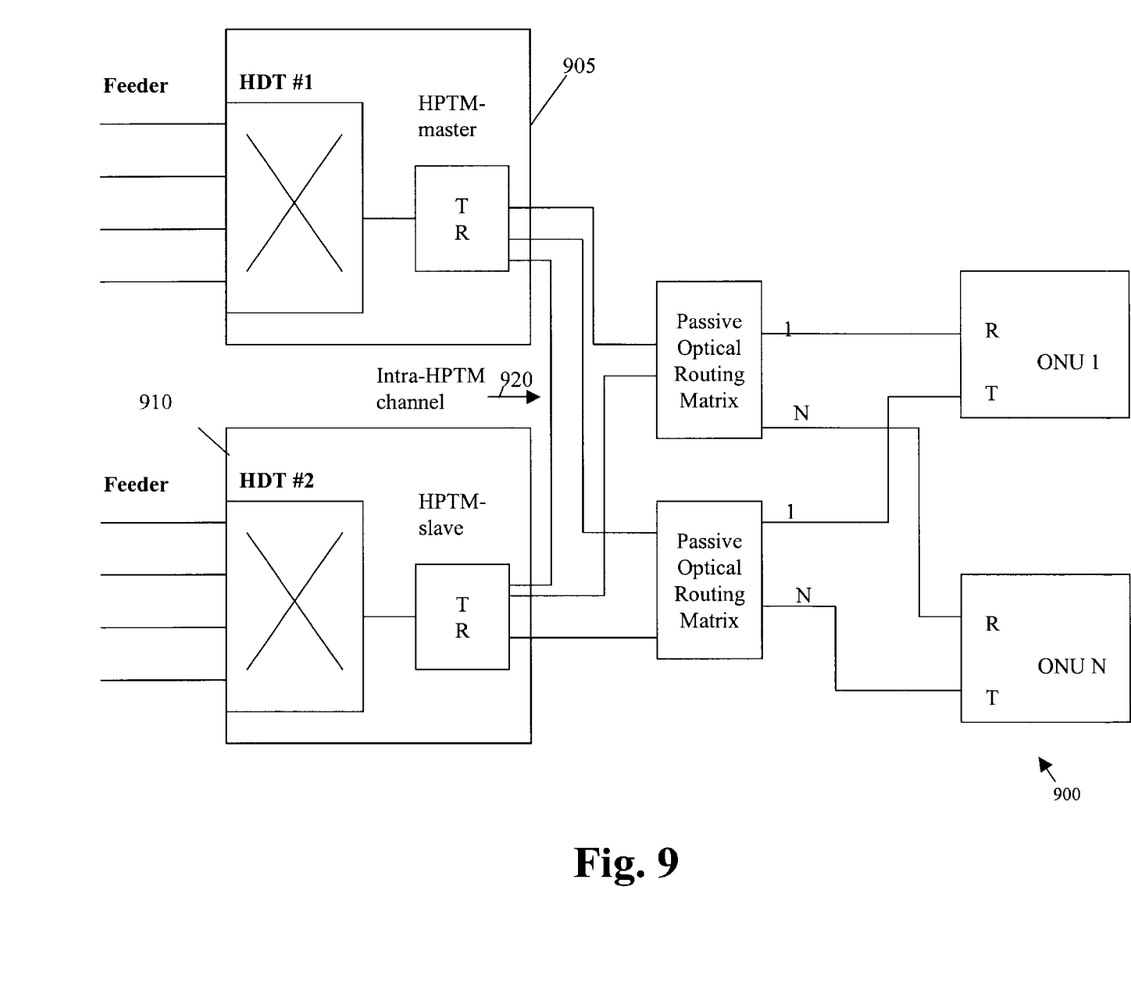
FIG. 9 is a block diagram of multiple HPTM PON.

A PON is supported by multiple Headend PON Termination Modules (HPTM) 905 and 910, as shown in FIG. 9. As mentioned above, it is possible to design a PON to support multiple data rates. In an embodiment of the present invention, it is possible to use separate slave HPTMs 910 to source the different data rates, as shown in FIG. 9. This allows the operator of the PON to scale up to higher data rates without initially having to decide exactly what those higher data rates will be.

For a given PON, one of the multiple HPTMs is the master 905 and the rest are slaves 910. The master HPTM 905 controls which HPTMs are assigned to a given portion of the frame. All time of flights (TOFs) are determined by the master and that information is passed by a separate data path, referred to as a intra-HPTM channel 920 in FIG. 9, between the Master HPTM and the slave HPTM. The actual TOFs for a given slave HPTM are a fixed offset from the master HPTM because the only difference in distance between the ONUs 1 through N and the HPTMs is the length of fiber between the HPTMs and the "Passive Optical Routing Matrix". The offset may be determined by a single ONU signon per PON for each slave HPTM.

Figure 10:
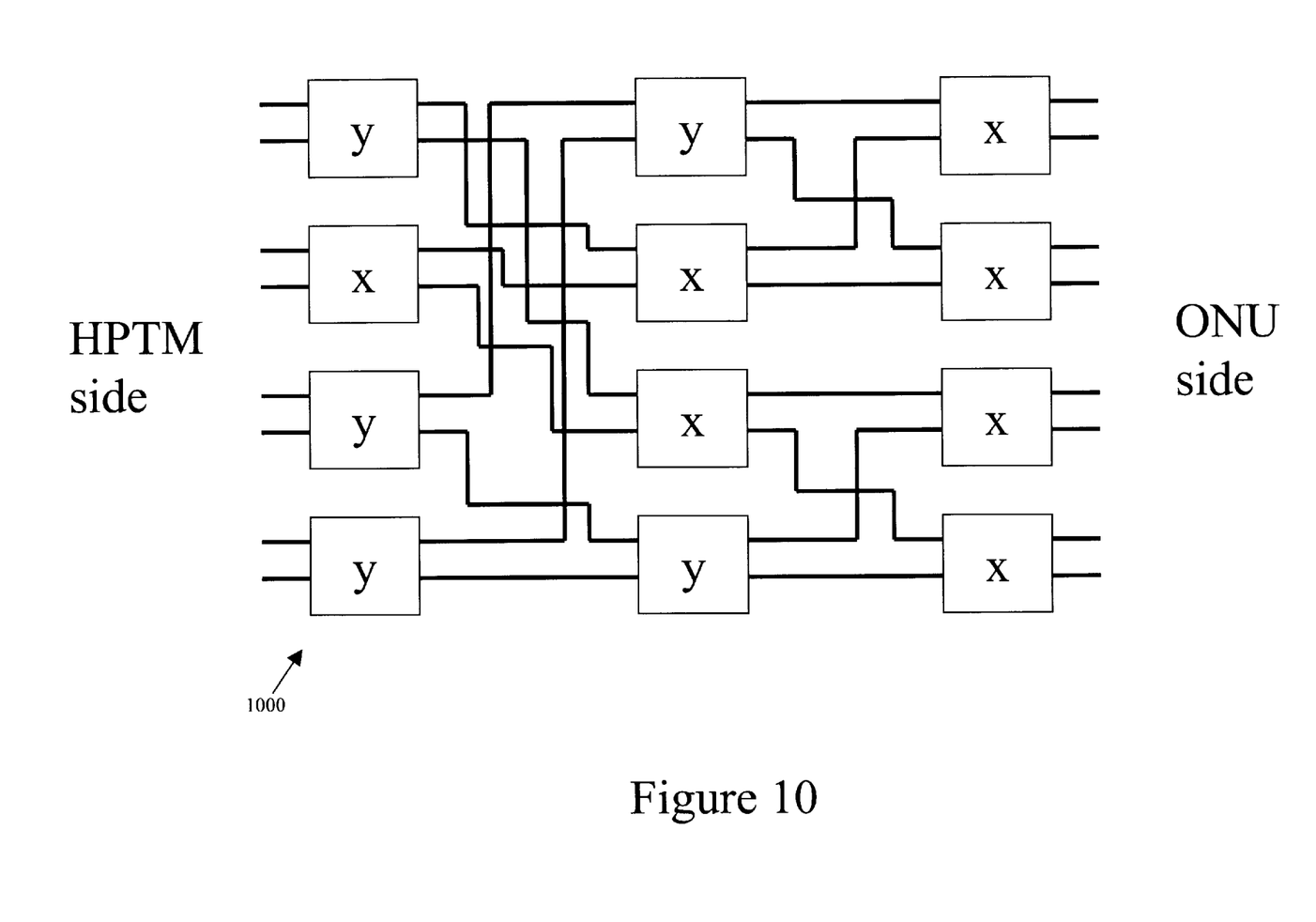
FIG. 10 is a block diagram of a 8 by 8 passive optical routing matrix.

There are many ways to construct the "Passive Optical Routing Matrix" to support a multiple HPTM network. As mentioned before it is important to minimize the loss through this matrix, and preferably to have a lower loss for higher data rate paths. The configuration 1000 illustrated in FIG. 10 does not show a lower loss for higher data rate paths but it provides equal path losses for any input port to any output port. This configuration can then be used as a starting point for centralizing the optical routing hardware. The example shown in FIG. 10 is for a 8×8 routing matrix, but holds for the general case of M×N (where M<N). It is possible to increase the number of HPTM is feeders to the PON split mechanism without changing the throughput loss. In other words it is possible to make a M×N (where M<N) splitter that will have the same throughput loss as the traditional PONs 1×N.

Centralized Optical Routing Hardware

The optical routing hardware for the network is grouped into centralized point(s) in the network and reduced loss paths are provided for higher data rates. Centralizing the optical routing hardware greatly facilitates upgrades. Prior art PON upgrades have optical routing components distributed throughout the network, as illustrated in prior art FIG. 2. This not only results in higher component costs but also is difficult to manage from an OAM&P perspective. As the optical technology evolves the functionality of this central optical routing facility can be upgraded. It is envisioned that it will migrate from a totally passive transport entity (with some limited active monitoring equipment) to an active transport entity which will route traffic optically, i.e. without converting back to the electrical domain, with a variety of technologies. Disclosed below are some optical routing facilities contemplated in an embodiment of the present invention.

The provision for reduced loss paths is important because it relaxes the design constraints on the optical transmitter and receiver. This should be reflected in the cost and the design cycle.

Variable Data Rate

Figure 11:
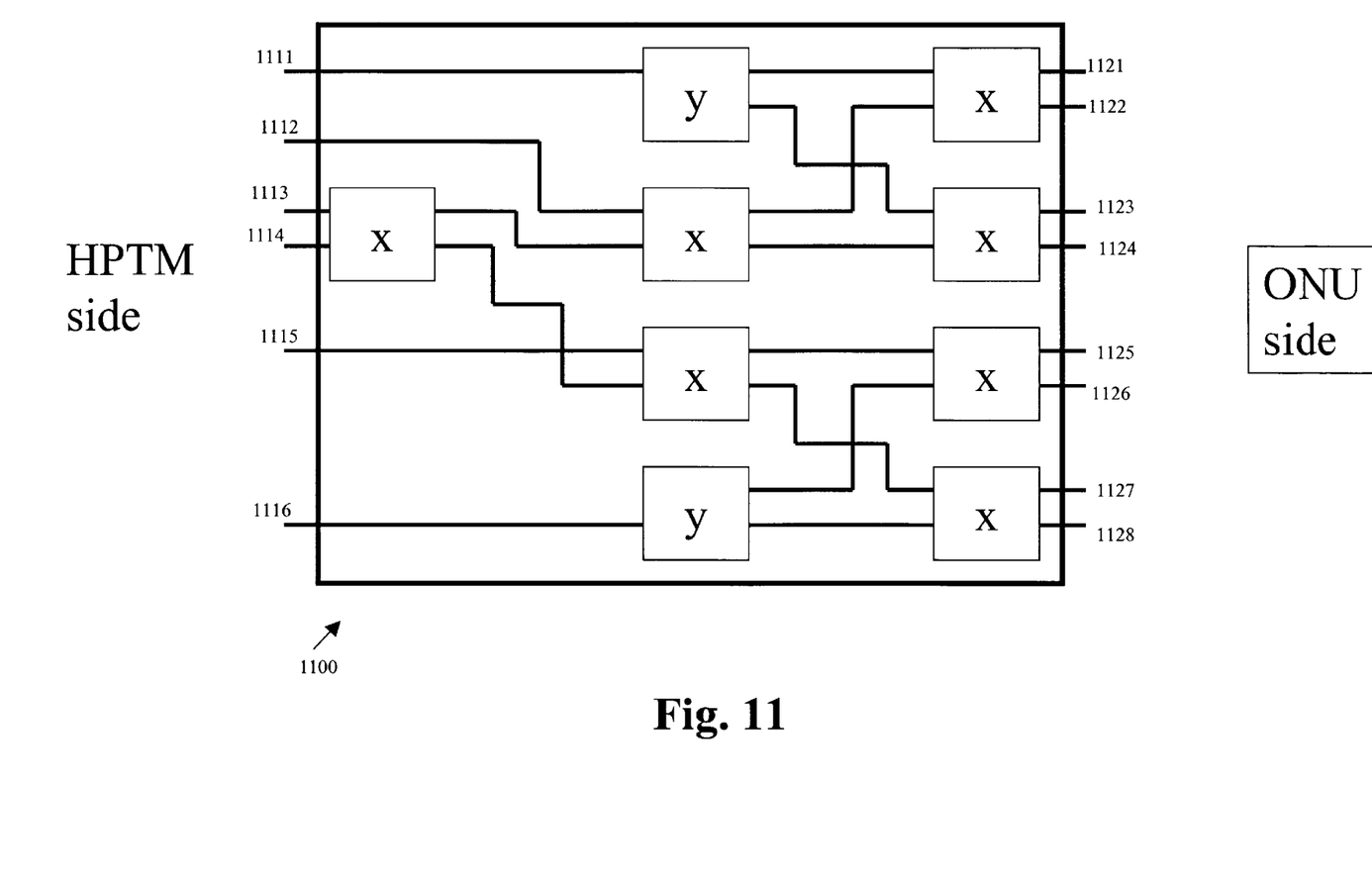
FIG. 11 is a block diagram of a 6 by 8 passive optical routing matrix.

With respect to FIG. 11, a block diagram of a variable data rate implementation of the present invention is provided. HPTM side ports 1111, 1112, 1115, and 1116 provide lower loss routes to ONUs 1121 through 1128, by reducing the split ratios. Splitters are utilized. Special consideration requires additional dark (unused) fibers to be installed between the HDTs and the splitter.

Sourcing Different Data Rates

Figure 12:
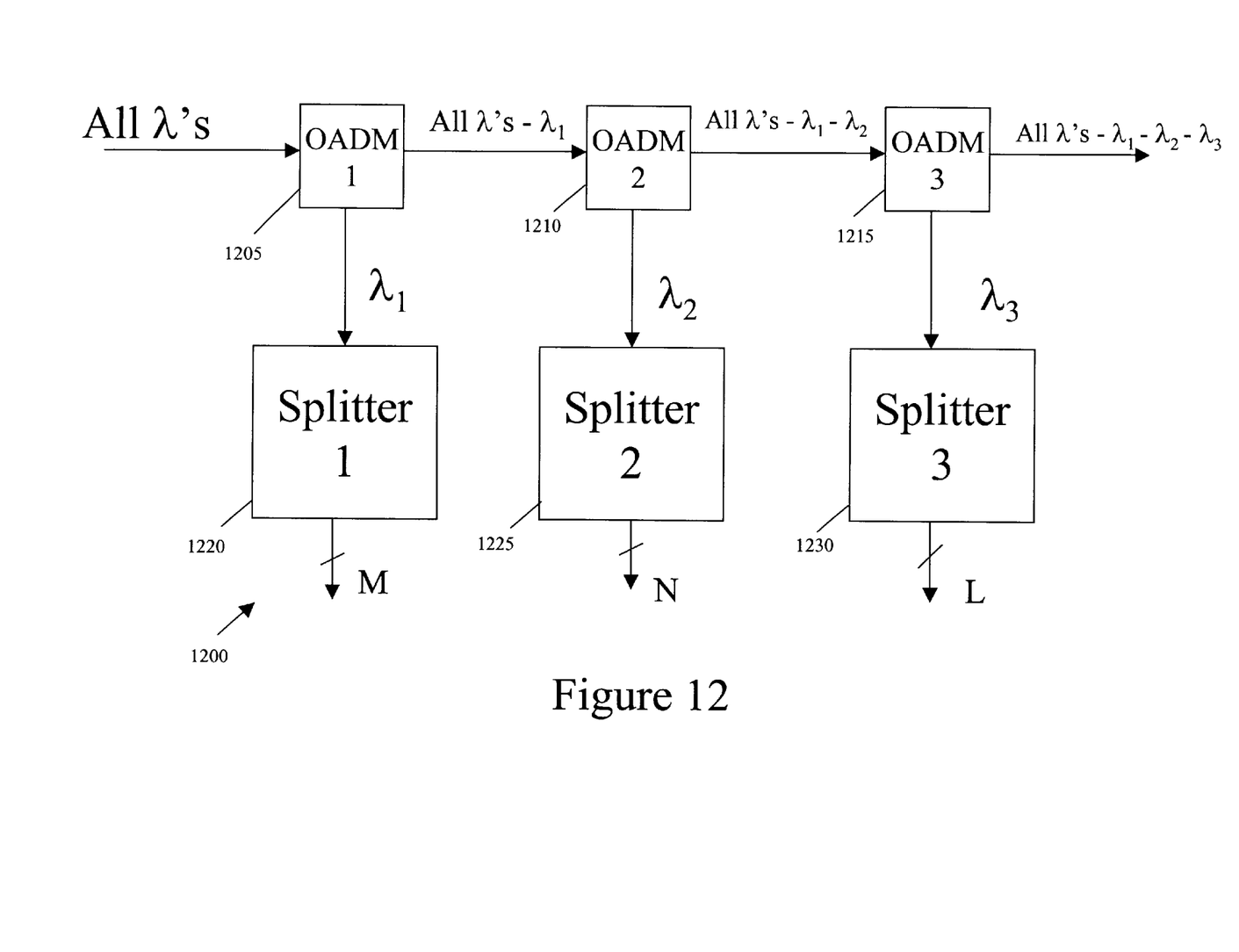
FIG. 12 is a block diagram of an expandable wavelength upgrade.

With respect to FIG. 12, an embodiment of the present invention is described for sourcing different data rates. OADMs 1205, 1210 and 1215 allow the network to expand. The new wavelengths are higher speed. The splitters 1220, 1225 and 1230 can either support more ONUs, or ONUs in need of upgrade could be jumpered using patch cord over to the higher speed PON. Technology used: (1) static OADM (with the possibility of migrating to dynamic OADM as they become available, (2) coarse WDM sources (migrating to DWDM sources as the cost is reduced), (3) splitters.

What is claimed is:

1. A passive optical network, comprising:
a host digital terminal having a variable rate transmitter to transmit a plurality of frames of data;
a multiplexer coupled with an input of the transmitter to selectively provide frames of data to the transmitter;
a retiming flip-flop device coupled between the multiplexer and the variable rate transmitter to transmit frames of data responsive to a control signal;
a splitter coupled with the host digital terminal to multiplex the frames of data; and
a plurality of optical network units, each optical network unit coupled with the splitter, and having a receiver circuit to receive the frames of data and adjust a data rate at which the frames of data are received at the optical network unit, based on timing information provided in the frames of data, wherein a data rate of a first optical network unit is different from a data rate of a second optical network unit.

2. The passive optical network of claim 1, wherein the control signal is to be derived, at least in part, from the transmitted frames of data.

* * * * *